Jan. 17, 1933.   O. U. ZERK   1,894,457
SUPPORTING MEANS
Filed Oct. 22, 1928   6 Sheets-Sheet 2

Jan. 17, 1933.  O. U. ZERK  1,894,457
SUPPORTING MEANS
Filed Oct. 22, 1928   6 Sheets-Sheet 6

Inventor
Oscar U. Zerk
By Williams, Bradbury
McCaleb & Hinkle
Attys.

Patented Jan. 17, 1933

1,894,457

UNITED STATES PATENT OFFICE

OSCAR U. ZERK, OF CHICAGO, ILLINOIS

SUPPORTING MEANS

Application filed October 22, 1928. Serial No. 314,073.

My invention relates generally to tripods and more particularly to tripods for use in motion-picture protography.

The main object of my invention is to provide a rigid, light and compact tripod head which will enable the amateur motion-picture photographer to take the most difficult pan and tilt views with the utmost degree of evenness, with both ordinary and the most powerful telephoto lenses irrespective of the unsteadiness of the operator's hand. The present devices used to steady the pan and tilt motion of tripod heads is to use two sets of speed increasing gears connected to a fly-wheel. Tripod heads of this type are too large, heavy, complicated and expensive to be used by amateur motion-picture photographers. The novel means which I have invented accomplish this result in a very simple manner.

Other objects of my invention are to provide:

(1) An improved tripod and tripod head which is light in weight, which when set up is very rigid and which is readily portable;

(2) An improved tripod head construction in which one part is universally mounted on the other and in which improved compressible means are utilized to prevent rapid accelerative movement of one of the parts relative to the other, thereby making it possible successfully to take harmonious pan and tilt views even with a very powerful telephoto lens;

(3) Improved resilient means for compensating for the weight of the camera when it is in a tilted position;

(4) Improved means for causing equal drag irrespective of the plane in which the camera is moved;

(5) Improved means to do away with backlash upon reversal of pan and tilt movements;

(6) An improved camera guide-bar;

(7) Improved distance operated means for clamping the tripod head, thereby to hold the camera stationary;

(8) Improved guide-bar means for compensating for the irregularities in the degree of manual pressure applied to the guide-bar when taking panoramic views with the camera, therefore making the harmonious movement of the guide-bar independent of the human element;

(9) An improved quick detachable means for connecting the guide-bar to the tripod head;

(10) Improved camera leveling means;

(11) Improved means for transmitting a clamping force through a hinged guide-bar;

(12) An improved tripod of extremely simple construction which may be economically manufactured and which is conveniently operable for use in taking motion-picture photographs in any desired manner; and (13) Improved means for attaching the camera to the head.

Other objects will appear from the following description, reference being had to the accompanying drawings, in which Fig. 1 is a rear elevation of my improved tripod and head, the legs being shown in collapsed position;

The tripod of my invention is particularly designed for amateur and semiprofessional use although many features thereof might readily be incorporated in tripods and tripod heads for professional use. The tripod is adapted to be used in taking motion-pictures with the camera held stationary or to take panoramic motion-pictures in any desired plane. The particularly rigid construction and the novel means for controlling the movement of the camera make it possible to take pan or tilt motion-pictures even with a very powerful telephoto lens. This is due to the extremely sensitive and efficient means which I employ to steady the rotative movement of the camera. The term "pan" shall herein be used to designate a panoramic view or the motion of the camera in taking a panoramic view in a horizontal plane, and the term "tilt" shall be used to designate the taking of a similar view or the motion of the camera in taking such a view in a vertical plane.

The tripod legs

Referring particularly to Figs. 1, 2, 4 and 15 to 18, inclusive, the tripod legs each comprises a plurality of telescoping sections 20, the outer one of which has its upper end threaded to a head 22 and the inner one of which is secured to a foot 24 by a pipe threaded connection. Each of the sections except the outermost section is flared outwardly at its upper end at a very small angle and the lower end of each section except the innermost section is tapered inwardly at the same angle. Thus, when the tripod leg is extended, each of the flared portions will be rigidly and frictionally wedged into the inwardly tapered portion of the next adjacent outer section.

The leg structure does not form a part of my present invention but is more fully disclosed and claimed in my Patent, No. 1,672,596, dated June 5, 1928, and in my copending application, Serial No. 208,219, filed July 25, 1927, and will therefore be but generally described herein.

Figures 4, 5, 6, 7:
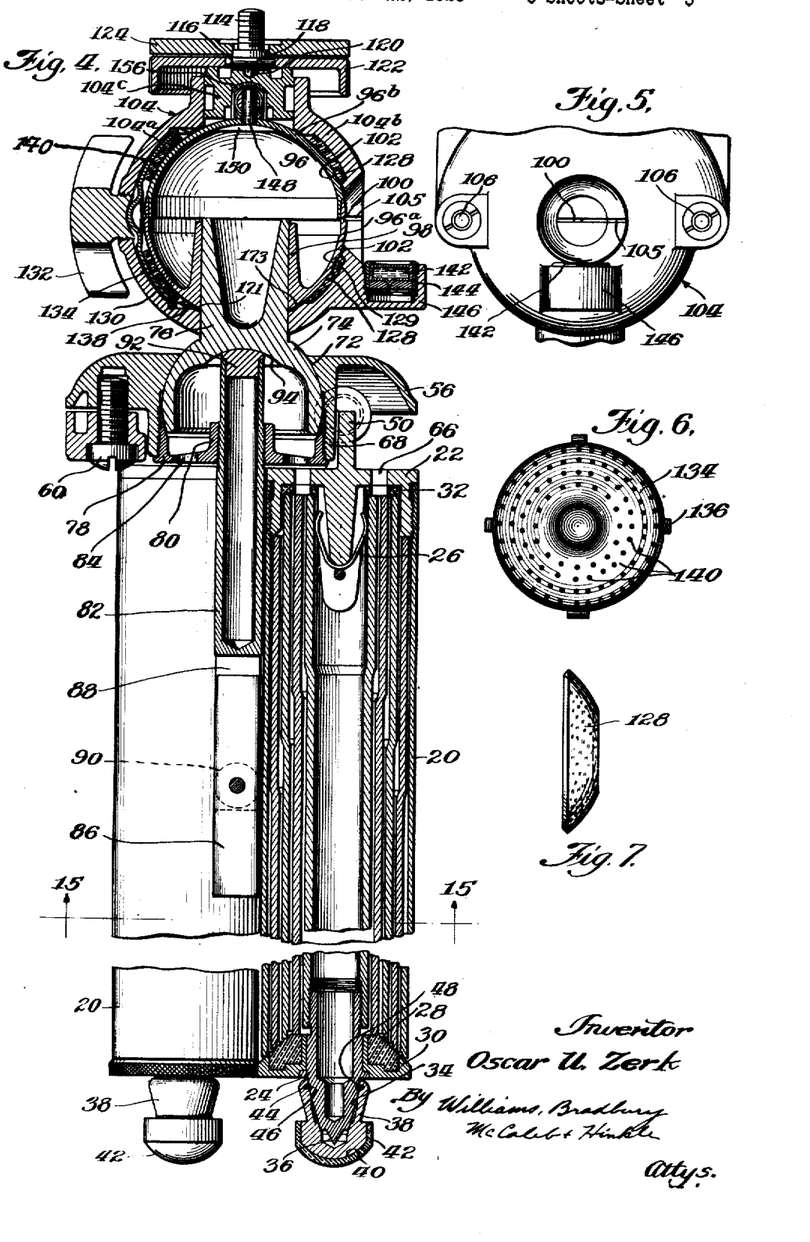
Fig. 4 is a central vertical section taken on the line 4—4 of Fig. 2.
Fig. 5 is a fragmentary right side elevation of the upper socket.
Fig. 6 is a plan view of a concave pressure plate.
Fig. 7 is a side elevation of the friction drag means.

The innermost section 20 has its upper end engaged by a hairpin shaped spring 26 which frictionally holds the leg in collapsed position as shown in Fig. 4, the lower ends of the intermediate sections resting upon an insert 28, formed of a suitable rubber, fiber or other similar material, in an annular trough shaped member 30 which is pressed over the foot piece 24. The upper ends of the three innermost sections abut against a washer 32 made of rubber or similar material and secured in the head 22. This washer and the insert 28 form semiresilient buffers which tend to decrease the shock and noise when the legs are collapsed.

The leg foot piece

The foot piece 24 has a frusto-conical surface 34 and a point 36. Means are provided to cover up the point 36 when the tripod is to be used indoors on a smooth floor or on ice or other similar smooth surface. This means includes a metallic cap 38 which has a tapered bore complemental to the frusto-conical surface 34 and a substantially spherical surface 40 which is covered by a thin layer 42 of rubber which is preferably vulcanized directly to the metallic cap 38.

The cap 38 has an annular groove 44 and the foot piece 24 a corresponding annular groove 46 which lie in registry when the cap is placed upon the foot piece. A split ring or C spring 48 normally carried in the cap 38 will snap partially within the groove 46 when the cap is placed over the point and thus rigidly hold the foot piece over the point. This connection may, however, readily be broken merely by a sudden pull or twist upon the cap whereupon the spring 48 will be cammed out of the groove 46 into the groove 44.

The leg hinge

Figure 17:
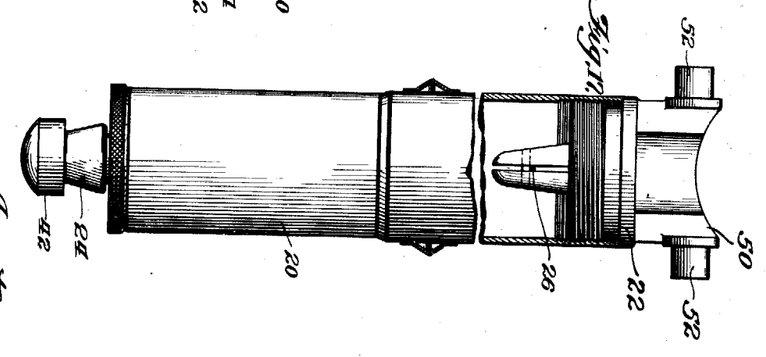
Fig. 17 is a side elevation of a tripod leg in partly extended position, portions of the outer section being broken away to show the internal construction thereof.
Figure 18:
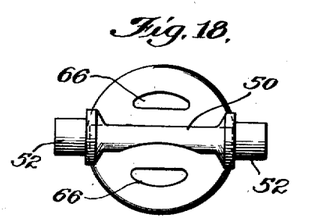
Fig. 18 is a plan view of the leg shown in Fig. 17.

As best shown in Figs. 17 and 18, the head 32 of each of the legs has an upwardly extending portion 50 having two sidewardly extending trunnions 52 which rest in suitable bearing recesses 54 formed in a hinge plate 56. A plurality of bearing cap plates 58 secured to the hinge plate 56 by screws 60 threaded in holes 62, hold the trunnions in place. Suitable bushings 64 are fitted around the trunnions 52 and are non-rotatably held in the recesses 54 between the bearing cap plate 58 and the hinge plate 56. Suitable air vent openings 66 are provided in the heads 32 to prevent the formation of a partial vacuum within the legs.

The head leveling means

The hinge plate has an internally threaded downwardly extending cylindrical flange 68 and has a bearing surface 72 cooperating with a hollow hemispherical portion 74 of a center post 76. A cap 78 has a flange threaded within the flange 68 and has an internally bored and threaded boss 80 into which a clamping screw 82 is threaded. The cap 78 has a plurality of apertures 84 adapted to receive a spanner wrench.

A short handle 86 is pivoted at the lower end of the clamping screw 82, normally lying within a longitudinal slot 88 formed therein, suitable washers 90 being placed at each side of the handle 86 to create friction and force the wing 86 to stay in any desired position. The upper end of the clamping screw 82 is hollowed and at its extremity has a plug 92 pressed therein. The plug 92 is adapted to engage a spherically concave surface 94 formed within the hemispherical portion 74 of the center post 76. The center of curvature of the surface 94 is identical with that of the spherical surface of the portion 74.

From the above detailed description, it will be seen that the center post 76 may be clamped in any desired position relative to the hinge plate 56 by turning the clamping screw to bring the plug 92 in frictional clamping contact with the spherical surface 94.

*The ball and socket and camera attaching means*

A hollow spherical ball 96 is formed of two steel stampings 96a and 96b, the stamping 96b having a suitable annular groove about its lower rim to receive the upper rim portion of the stamping 96a. The stampings 96a and 96b are pressed and soldered together to form a unitary rigid ball. The stamping 96a has an inwardly extending annular boss 98 which is reamed to receive the center post 76. The ball is pressed over the center post so as to be rigid therewith and for practical purposes may be considered to be an integral part of the post. The ball 96 has a shallow horizontal great circle groove 100 formed therein and a pair of zonal grooves 102 equally spaced from the groove 100.

A metallic socket 104 comprises portions 104a, 104b and 104c, which are joined by bolts 106. The bolts 106 have pins 108 passing diametrically therethrough, the pins being slidable in suitable slots 110 formed in the socket portion 104a. These pins prevent the bolts from rotating. A plurality of screws 112 pass freely through the portions 104a and 104b, respectively, and are threaded in the portion 104c.

A camera attaching screw 114 has a square head 116 with a small hemispherical projection 118 thereon. The projection 118 rests in a suitable spherical recess 120 formed in the portion 104c. A knurled thumb piece 122 has a central square opening therein which receives the square head 116 of the screw 114.

Figures 2, 3, 19:
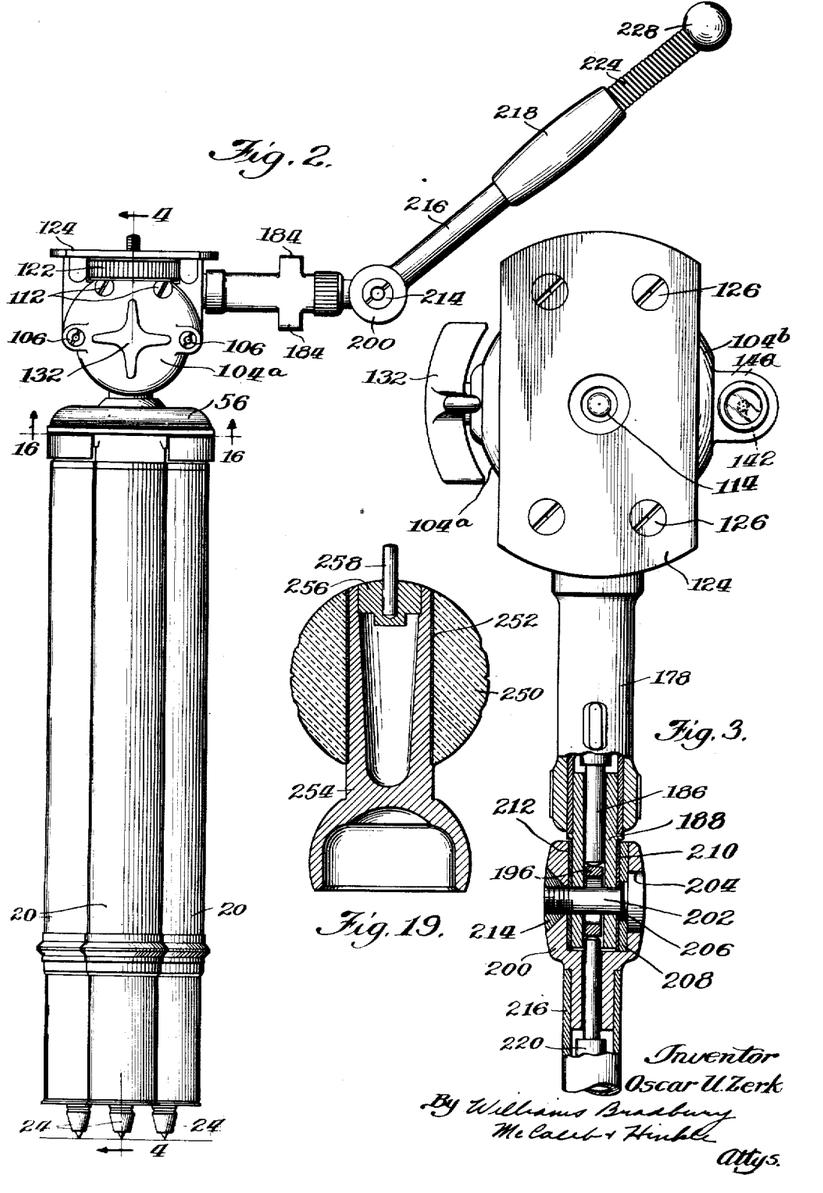
Fig. 2 is a left side elevation of the tripod and head.
Fig. 3 is a plan view thereof, a portion of the handle being shown in section and the end thereof broken away.
Fig. 19 is a central vertical section of a modified form of ball.

The screw 114 is, however, longitudinally slidable with respect to the thumb piece 122 so that downward pressure upon the screw is transmitted directly to the projection 118 and its bearing socket and is not transmitted to the thumb piece 122. The thumb piece 122 is of substantially the same diameter as the width of the camera supporting plate 124 which is secured to the portion 104c by four screws 126 (Fig. 3).

The socket portion 104b is suitably recessed to receive a concave compressible socket half 128 which is preferably held in the recess by a plurality of small pointed projections 129 formed in the bottom of the recess. The compressible socket 128 is preferably made of a semihard compressed cork. Other materials, such as packing rubber, hydraulic leather, buffalo leather, dense felts, etc., may be used if desired.

A compressible socket half 130 which is similar to the socket half 128 in shape and physical characteristics, is normally pressed against the surface of the ball 96 by a wing headed screw 132 which is threaded in the socket portion 104a and the end of which engages a concave pressure plate or clamping disc 134. This disc, best shown in Fig. 6, has a plurality of lugs 136 extending outwardly from the peripheral edge thereof. These lugs are slightly press fitted into suitable grooves 138 formed in the metallic socket portion 104a. The disc 134 is thus held against even the slightest rotative movement with reference to the metallic socket portion 104a but may be forced to the right (Fig. 4) to press the compressible socket half 130 against the ball. The compressible socket half is preferably held to the disc 134 by suitable pointed projections 140 formed on the disc 134 but may be secured thereto by cement or in any other suitable manner.

The ball preferably has an extremely hard and an absolutely non-tarnishing surface finish, such, for example, as a hard chromium plating, so that the harmonious drag between these compressible socket halves and the ball will be very uniform.

A spirit level 142, preferably of the type made of a single piece of glass, is held within a bushing 144 threaded in a lug 146 which is integral with the socket portion 104b.

*The camera balancing or compensating means*

A pin 148 having a head 150 is welded or sweated in the top of the ball stamping 96b and forms an abutment for a pair of springs 152, 154, the other ends of which rest upon the bolts 106, the latter having portions thereof cut away to form seats for the springs and to permit the use of a longer spring in the limited space available for the springs. These bolts may readily be removed and springs of greater or lesser strength substituted for the springs 152, 154 when the tripod is to be used with cameras heavier or lighter than normal.

A semicircular trough shaped hardened steel member 156 forms a guide for the springs 152, 154. Short pins 158 are riveted or otherwise suitably secured at the lower ends of the member 104c and normally rest in suitable apertures formed in the hardened steel member 156. The resiliency of the member 156 normally holds it within the socket member 104c in the postion shown in Fig. 8 but it may readily be removed therefrom (after the socket has been removed from the ball) by pressing the lower ends of the steel member 156 inwardly with a suitable tool to free them from engagement with the pins 158. The member 156 is so hard that the springs will not abrade its surface, thus eliminating the possibility of metallic chips and dust being loosened by the spring and falling between the ball and the packings.

*The means for rigidly clamping the metallic socket to the ball*

Figure 14:
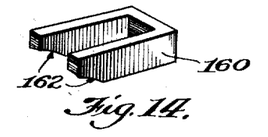
Fig. 14 is a perspective view of the clamping yoke.
Figure 15:
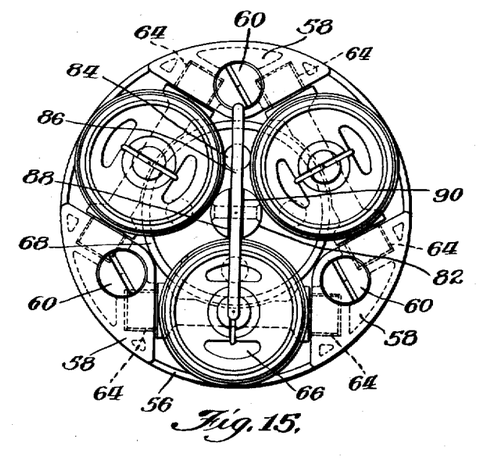
Fig. 15 is a bottom plan view taken on the line 15—15 of Fig. 4, the leg sections being omitted.
Figure 16:
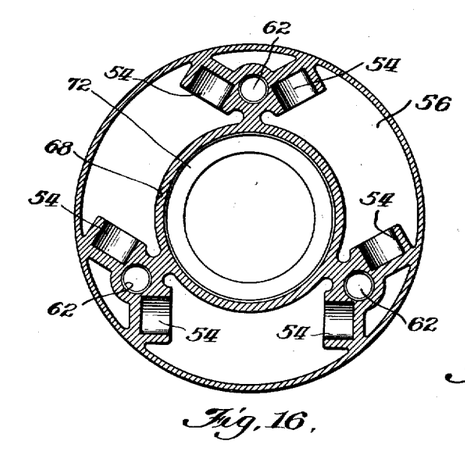
Fig. 16 is a sectional view of the hinge plate taken on the line 16—16 of Fig. 2.

Means are provided rigidly to clamp the socket to the ball. This means comprises a pressure yoke 160 (Fig. 14) which has surfaces 162 to conform to the spherical shape of the ball 96. The yoke 160 is guided for limited sliding movement within the portion 104c and encompasses the spring 154 and the spring guide 156. It is also guided by the cylindrical extensions 164 of a pair of screws 166 which are threaded in the metallic socket portion 104c. The portion 104c has an externally threaded boss 168, the outer face of which has a plurality of teeth 170 spaced at intervals of 90 degrees.

Figure 11:
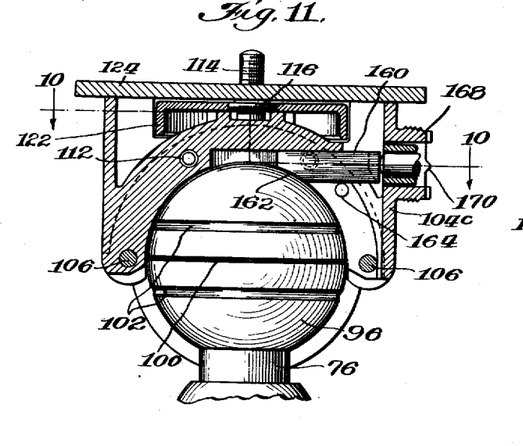
Fig. 11 is a vertical section taken on the line 11—11 of Fig. 10.
Figure 12:
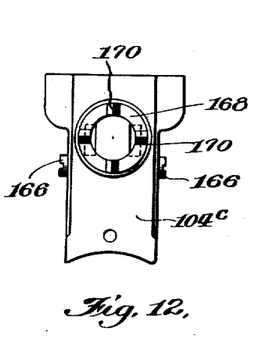
Fig. 12 is a right side elevation of the upper socket casting.

The yoke 160 is adapted to be moved to the left (Figs. 8 and 11) by means which will be described hereinafter. When thus moved to the left the surfaces 162 of the yoke member will cammingly engage the surface of the ball 96 and raise the socket 104 slightly relative to the ball. The metallic socket portions 104a and 104b have zone-shaped surfaces 171 and 173, respectively, the lower portions of which will, when the socket is raised on the ball, frictionally engage the lower surface of the ball, thereby rigidly clamping the socket to the ball. During this clamping operation the lower portions of the two compressible socket halves 128 and 130 will also be slightly compressed and will aid in holding the socket fixedly on the ball.

When the yoke 160 is permitted to move to the right, the said lower portions of the compressible socket halves 128 and 130 will expand to normal position and the surfaces 171, 173 will no longer contact with the surface of the ball but will take the position shown in Fig. 4.

To reiterate, the tripod has two sockets, a metallic non-resilient socket and a compressible cork socket. The metallic socket is used only for clamping the metallic socket against the ball but never for panning. The compressible socket, however, is only used for panning and tilting, but indirectly also for clamping because part of the compressible socket has to be compressed by the ball before the ball will touch the metallic socket. It is very important that the compressible cork socket project inwardly farther than the zonal surfaces 171, 173 of the metallic sockets 104a and 104b, so that there will be no metal to metal contact even if the most powerful drag pressure is applied by the drag regulating screw 132, since the harmonious pan and tilt motion is due materially to the fact that there is no metal to metal contact during the panning and tilting operation.

*The hinged guide-bar*

Figures 8, 8A, 9, 20, 21:
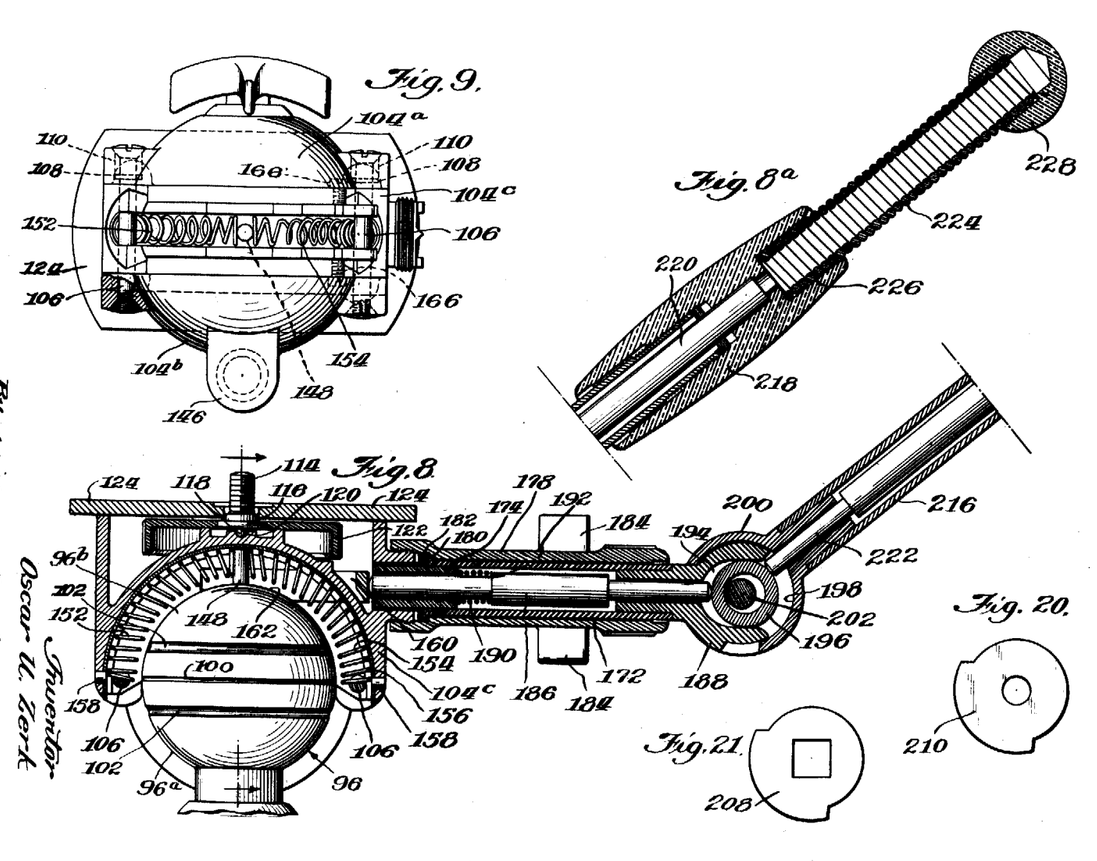
Figs. 8 and 8a together constitute a central vertical section of the upper portion of the tripod head and guide-bar or handle.
Fig. 9 is a bottom plan view of the upper socket with the upper ball removed.
Fig. 20 is a detail plan view of a washer forming part of the handle hinge joint.
Fig. 21 is a detail plan view of another washer forming part of the handle hinge joint.
Figures 10, 13:
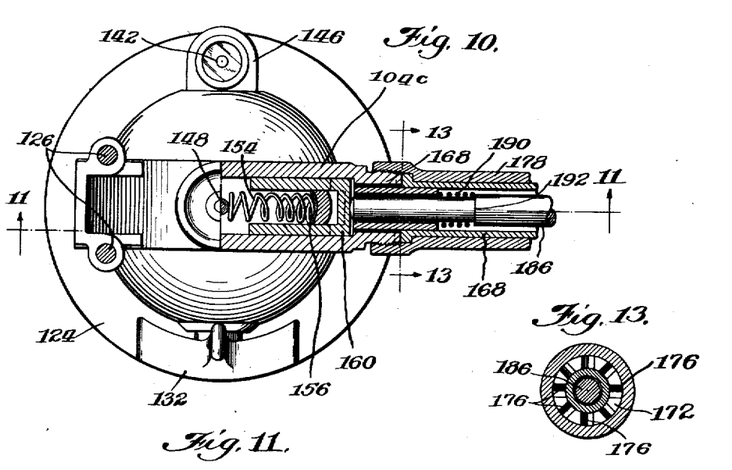
Fig. 10 is a horizontal section taken on the line 10—10 of Fig. 11.
Fig. 13 is a vertical section taken on the line 13—13 of Fig. 10.

A sleeve 172 having an extension 174 of reduced diameter pressed therein has eight recesses 176 spaced at 45 degree intervals about its left-hand end surface (Figs. 8, 10 and 13). The sleeve 172 is secured to the boss 168, with four of its recesses 176 in engagement with the teeth 170, by a tubular clamping member 178, the left-hand end of which is threaded to the boss 168 and which has a shoulder 180 engaging a complemental shoulder 182 formed on the sleeve 172.

The clamping member has suitable wings 184 by which the clamping member may readily be manually rotated. A pin 186 is guided for longitudinal movement in the extension 174 and in a hinge lug 188 which is pressed into the right-hand end of the sleeve 172. A spring 190 compressed between the right-hand end of the extension 174 and a shoulder 192 on the pin 186 tends normally to move the pin to the right to take up the play and prevent vibration (Fig. 8).

The hinge lug 188 has a slot like recess 194 formed therein to receive an annular pressure transmitting ring 196. The hinge lug 188 projects within the substantially circular recess 198 formed in the female hinge lug 200. A bolt 202 has a cylindrical head freely rotatable in a complementary opening 204 formed in the female hinge lug 200 and has a square shoulder 206 which fits in a square hole in a duralumin washer 208 which is shown in Fig. 21. The bolt passes through an opening in the ring 196 and passes through suitable openings in brass washers 210 and 212 (Fig. 20) which are interposed between the relatively moving parts of the hinge. The bolt has a nut 214 which fits in a suitable countersunk recess in the female hinge lug 200 and lies substantially flush with the outer surface of the lug. Due to this construction the nut 214 cannot unscrew through any movements of the hinge lugs 188 and 200.

A tube 216 is rigidly secured to the female hinge lug 200 and its outer end has a handle 218 threaded thereto. The handle 218 is preferably made of a suitable phenol condensation product, hard rubber or similar material, nd has a rod 220 fixed thereto. The rod has an extension 222 of reduced diameter which is guided in the female hinge lug 200 and is adapted to contact with the ring 196.

A tightly coiled spring 224 fits within a cylindrical recess 226 formed in the outer end of the handle 218. The diameter of the recess 226 is preferably slightly less than the normal outside diameter of the coil spring 224 so that the latter may be forced into the recess and be tightly retained therein due to the expansive force of the coils of the spring. A ball shaped auxiliary handle 228 is secured to the other end of the spring 224 in a manner similar to that previously described.

The harmonious drag utilized in taking pan and tilt views is mainly due to the total absence of metallic dust and metallic oxide between the compressible socket halves 128 and 130 and the ball. Accumulated metallic dust acts like a metal socket so that if some of the chromium should be abraded from the ball 96 by the compressible cork washers 128, 130 and the pressure action of screw 132 it would interfere slightly with the harmonious drag when taking pan a .d tilt views. Absolutely to preclude the possibility of pulverized metal or metallic dust from being deposited upon the compressible socket halves, I have provided a modified form of ball, shown in Fig. 19. This ball 250 is preferably made of a hard glass and has its outer surface polished so as to be a perfectly smooth sphere. Other nonmetallic materials which do not abrade readily, such as porcelain, hard phenolic condensation products, or other hard material which is not readily abraded, may be used in place of glass.

The ball 250 has a central vertical bore 252 to receive a center post 254. The bore is preferably made of slightly larger diameter than the portion of the post 254 which fits in the bore, and the ball 250 accurately centered on the post and then cemented thereto. The post 254 preferably has its upper end hollowed and fitted with a plug 256 rigidly secured therein. The plug 256 is drilled to receive a pin 258 which serves the same purpose as the pin 148 previously described.

With this modified form of ball there will not be any possibility of metallic dust or metallic oxide collecting upon the surfaces of the compressible socket halves and will therefore not impair the smooth harmonious drag effect between the ball and the compressible socket halves.

The use of the hinged guide-bar

The tripod is normally carried in a case with the handle straightened and disconnected from the tripod head. Thus the first operation in setting up the tripod, after the legs have been extended and separated so as substantially to level the hinge plate 56, is to attach the handle (which is here intended to include all of the parts 172 to 228) to the tripod head. The handle is preferably bent at an angle, as shown in Figs. 2 and 8, for purposes as will more fully hereinafter appear.

The handle is held in bent position due to the friction at the hinge joint between the hinge lug 188 and the washers 210 and 212, and between these washers and the washer 208 and the female hinge lug 200. The bolt 202 may be tightened to provide any desired degree of friction on this hinge. The friction should, however, be sufficiently great so that there will be no relative movement between the two parts of the handle at the hinge joint when the tripod head is panned or tilted.

The bent handle has several advantages. When bent to the right, that is, the position indicated at A in Fig. 1, it is out of the way of the operator so that he may readily sight through the finders of the camera while moving the camera by means of the handle. A left-handed operator would position the handle as shown in dotted lines at B, in Fig. 1, for the same reasons. When taking a motion-picture in which a horizontal pan movement follows after a very deep or high vertical or tilt movement of the camera, such, for example, as when taking the picture of a building, following up one side wall thereof and then traversing the cornice, or in taking the picture of a waterfall in which the field of the camera is brought downwardly along the falls and then is panned to bring the base of the falls and the scenery to the right or left of the falls in view, it is highly desirable that the handle be in a position as near horizontal as possible in order that full leverage may be had on the tripod head during the panning movement.

When it is desired thus to take a tilt picture of a very high building as above described, starting from the horizontal, the handle would be set in the position shown in full lines in Fig. 1. Thus, after the camera has completed the upward tilt movement the handle will still be fairly close to the horizontal so that substantially the full leverage of the handle may be utilized in taking the pan view at the end of the very high tilt view. Similarly, if it is desired to take the picture of a very deep waterfall from the top of the falls, as above described, whereby it is necessary to tilt the camera through a relatively large angle, the handle will initially be placed in the position shown in dotted lines at C in Fig. 1. Thus, after following down the waterfall the handle will have been raised to slightly above a horizontal position and substantially the full leverage of the handle may be exerted in taking the pan view at the base of the falls.

Similarly, the handle may be adjusted at the intermediate 45 degree positions shown in dotted lines in Fig. 1 to accomplish similar purposes. It will be noted that the handle is hinged at an appreciable distance from the tripod head. Thus when the handle is bent it will not interefre with the type of camera which has a large base.

Camera attaching operation

The camera may then be attached by means of the screw 114. The weight of the camera will not be transmitted to the thumb piece 122 but will bear solely on the projection 118 which rests in the bearing socket 120. The fact that the camera screw is vertically movable with respect to the thumb piece 122 thus relieves the latter element of all friction due to the weight of the camera and makes it easy to turn the screw in attaching the camera to the tripod head.

Furthermore, by means of this construction a screw 114 of such size and thread to fit any desired non-standard make of camera, may readily be substituted without necessitating the replacement of the thumb screw. A screw may be substituted merely by removing the four screws 126 and plate 124 whereupon the screw 114 may readily be removed and another inserted to take its place.

Leveling the tripod head

Assuming that the portion 74 is clamped in its socket 72 and having attached the camera, it is necessary accurately to position the center post 76. This is done by first aligning the groove 105 which is formed in the socket portion 104b with the horizontal great circle groove 100 formed in the ball 96. The socket 104 is then clamped to the ball 96 by tightening the guide bar handle 218. The clamping screw 82 is then loosened so as to permit the spherical portion 74 of the center post 76 to be shifted in the socket 72 formed in the hinge plate 56. The ball and socket may thus be moved universally with respect to said hinge plate until the spirit level 142 indicates that the parts are in horizontal position. When this is the case the screw 82 is turned up so as to clamp the ball portion 74 of the center post 76 firmly in its socket in the hinge plate.

As shown in Fig. 1, the handle portion 86 of the screw 82 may be turned so as to be perpendicular to the axis of the screw, thereby to obtain the leverage necessary firmly to clamp the hollow ball portion 74 in its socket. The tripod head will then be in position to take a picture with the camera held stationary and pointing in a horizontal plane.

Operation of taking pan views

Assuming that the tripod head has been leveled as above described, a pan view is taken in the following manner. The guide-bar handle 218 is unscrewed slightly so as to relieve the clamping pressure of the yoke 160 upon the ball 96. A certain amount of frictional drag is then applied between the ball and the compressible socket halves by turning in the screw 132. The frictional drag thus caused between the compressible socket halves and the ball is sufficient normally to hold the metallic socket portion stationary on the head but will permit movement thereof upon application of a fairly small force to the handle knob 228.

Since the ball has a very smooth and hard outer surface and is, with the exception of the grooves 100 and 102, nearly as perfect a sphere as may be produced, the frictional "drag" tending to prevent rotation of the socket on the ball will be extremely uniform. The degree of drag may readily be varied by turning the screw 132. This screw transmits the pressure directly to the plate 134 which is movable toward the ball, being guided by its lugs 136. Since the pressure of the single screw 132 is transmitted equally to both cork socket halves 128 and 130, the frictional drag of each of these cork sockets upon the ball will at all times be the same.

The uniformity of the drag is due to the evenly distributed pressure of the compressible cork socket halves which adapt themselves to the unescapable slight unevenness of the ball, due to the creation of a slight partial vacuum at the contacting surfaces between the ball and the compressible socket halves, and due also to the entire absence of metallic dust and metallic oxide on the contacting surfaces of the compressible socket halves.

The operator may pan the camera preferably by grasping the auxiliary handle 228 and moving the latter in a horizontal plane. In doing so the spring 224 will bend before the guide-bar will move and any small variation from a uniform movement of the operator's hand will be taken up by the spring. The speed of pan movement of the socket will of course depend upon the pressure exerted upon the auxiliary handle 228 but irrespective of the degree of pressure exerted the spring 224 will compensate for the slight tremors of the operator's hand.

It has been found that with the combination of the resilient handle and the adjustable pressure cork sockets engaging a smooth and hard spherical ball, a very uniform pan movement of the camera may be obtained, even though the operator's hand is unsteady. If, for example, the operator's hand is unsteady it may stop momentarily; however, the bent coil spring 224 will straighten out slightly and compensate for the pause in the movement of the operator's hand and thus keep the rigid portion of the guide-bar and camera in motion. If, on the other hand, the operator should exert an increased pressure upon the knob 228 for a moment, this increased pressure would merely bend the spring 224 a little further during this short interval without reacting upon the motion of the guide-bar. It will thus be seen that slight irregularities in the degree of force applied to the knob 228 will not disturb the harmonious movement, due to the compensating effect of the spring 224 and the even frictional drag of the cork socket halves. During such movement of the camera the hinge in the guide-bar remains fixed. Rather, a straight thin spring wire or other flexible and resilient means can be used in place of coil spring 224.

*Clamping the socket to the ball*

As above intimated the socket may be clamped to the ball through operation of the main handle 218. This is accomplished by turning the handle 218 and screwing it onto the tube 216. Since the rod 220 is fixed relative to the handle 218, its extension 222 will engage the ring 196 and, irrespective of the angle at which the handle is bent, will force the ring toward the pin 186 and move the latter to the left (Fig. 8), compressing the spring 190 and moving the pressure yoke 160 to the left also. The surfaces 162 of the yoke will thus be forced firmly into contact with the adjacent surface of the ball. The metallic socket 104 will therefore be moved upwardly against the stationary ball and after compressing the lower portions of the two cork sockets 128 and 130 the two lower portions of the zonal metallic surfaces 171 and 173, formed on the socket portions 104a and 104b respectively, will be pressed against the ball, thus locking the entire metallic socket against the ball.

The pressure yoke 160 is limited to horiontal movement (Fig. 8) by the guiding surfaces in the socket 104c and by the ends of the screws 164. Upon unscrewing the handle 218 from the tube 216 the spring 190 will expand to move the pin 186 to the right, thereby relieving the pressure on the yoke 160 and again permitting movement of the socket on the ball.

*Taking tilt views, and operation of camera weight compensator*

When taking a tilt view the guide-bar may, if desired, but not necessarily, be straightened so that the tube 216 is in alignment with the sleeve 178 and the socket and camera moved on the ball in a vertical plane. During such movement either the spring 152 or 154 is compressed (depending upon whether the camera is tilted upwardly or downwardly). The springs 152 and 154 thus compensate for the weight of the camera as it is moved from its horiontal position.

It will be noted that as the center of gravity of the camera is moved further from its normal position directly above the ball 96 the compression of either the spring 152 or the spring 154 will become greater so that the camera may be tilted downwardly and then returned to normal position or tilted upwardly and then returned to normal position with substantially the same force applied to the handle throughout the tilting movement. The springs thus tend to cause an even, uniform movement of the camera when taking tilt views by counterbalancing the weight of the camera.

The springs 152 and 154 are of maximum length, the screws 106 being partially cut away so as to make it possible to increase the normal length of the springs. The spring guide member 156 forms a retainer for the spring coils to maintain them in arcuate alignment and permits the coils to move fairly freely relative to one another due to its low coefficient of friction. The friction is caused by the tendency of the bent spring to press in an outward direction. After removal of the socket from the ball the member 156 may readily be removed since it is held in the yoke 104c merely by the pins 158 which are held into small holes in the member 156 by its own resiliency. Springs of different strength suited to the weight of the camera with which the tripod is to be used may then be easily substituted.

When taking tilt views the moment arm of the frictional drag exerted by the cork sockets 128 and 130 would normally be slightly less than the moment arm of the frictional drag of these packings when taking a pan view, due to the shape of the packings and to the position in which they are located in the socket. I have provided novel means for compensating for this difference in frictional drag. These means comprise the grooves 100 and 102 formed in the surface of the ball 96. These grooves are sufficiently deep so that the compressible cork socket halves will be pressed partially into these grooves.

When the tripod head is panned the panning drag would be the same even if the grooves 104 and 100 were not formed in the ball but when the tripod head is tilted the frictional drag is increased due to the fact that portions of the compressible cork socket halves are forced into the grooves and have to be compressed again when they are moved out of the grooves. Thus when taking a pan view the small portions of the cork sockets which lie within the grooves will stay within the groove throughout rotation of the socket 104 about the ball. When, however, the socket is rotated about the horizontal axis of the ball during a tilting movement the small portions of the cork packings which lie in these grooves will necessarily be forced out of the grooves and thus an additional frictional drag will be present during tilt movement of the socket. This added drag is just sufficient to compensate for the abovementioned difference in the pan and tilt moment arms of the frictional drag exerted by the packings. Stated in another way, the cork sockets move in the direction of the grooves when the camera is panned but move in a direction transversely or obliquely to the grooves when the camera is tilted or rotated in other than a horizontal plane, and the grooves in the latter instances effect increased friction.

The movement of the camera is not limited to rotation in horizontal or vertical planes but may be moved in any desired oblique plane. During movement in an oblique plane the grooves function to compensate for the varying frictional drag of the packings, the degree of increase of the drag being of course dependent upon the angle of obliquity.

*General operation*

After the taking of the picture has been completed the camera and the handle are preferably detached, the handle being straightened and removed merely by unscrewing the sleeve 178, the wing 86 of the screw 82 turned to the vertical, and the tripod legs may then be collapsed by placing the legs in substantial parallelism and bringing them downwardly against the ground with a sharp blow, whereupon the innermost section of each leg will hold the leg in collapsed position through its frictional engagement with the spring 26. During this collapsing operation the rubber or other resilient buffers 28 and 32 will absorb a large portion of the shock and eliminate excessive noise. The rubber foot pieces 38, 40 may of course be attached or removed from the points 24, depending upon the condition of the ground or floor upon which the tripod is to stand.

My invention, using a compressible socket, may readily be applied to other types of devices for universally mounting a camera, such, for example, devices having two swivels perpendicular to each other. In such devices the cork or similar socket member may be interposed between the relatively rotating parts and means provided to compress the cork or other material. Similarly the flexible resilient guide-bar herein disclosed is not limited to use in the particular combination disclosed but may readily be employed to advantage in tripod heads using steadying means other than the compressible socket disclosed herein.

The above described tripod thus accomplishes the objects initially stated, forming a readily portable device which may quickly be extended and collapsed, which is capable of producing uniform panoramic motion of the camera, which compensates for the weight of the camera when it is off center, which is convenient, may be readily manufactured, and which may be readily adapted for varying conditions of use.

The invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. In a tripod, the combination of a post member, a ball member rigidly secured thereto, a socket member surrounding said ball, a compressible element secured to one of said members, means to force one member against the other to create friction, means to attach a camera or other instrument to one of said members, and other means connected to one of said members for clamping said member against the other member by application of a force in a direction perpendicular to that applied by said forcing means.

2. In a tripod, the combination of a post, a ball rigidly secured thereto, a socket surrounding said ball, a compressible packing material placed between said socket and ball, a plurality of points projecting from said socket into said packing to hold the latter in position, a screw threaded in said socket adapted to force said packing into engagement with said ball, and means to attach a camera or other instrument to said socket.

3. In a tripod, the combination of a post, universally adjustable means for supporting said post, a ball rigidly secured thereto, a socket surrounding said ball, a pair of resilient packings between said socket and ball, a movable pressure plate behind one of said packings, means for preventing rotation of said plate adjustable screw means carried by said socket, engaging said pressure plate and operable therethrough to force said packings into frictional engagement with said ball, means to attach a camera to said socket, and handle means connected to said socket for moving the latter relative to said ball.

4. In a tripod, the combination of a normally stationary ball, a socket surrounding the major portion of said ball, a guiding handle secured to said socket, means operable by the movement of said handle to clamp said socket to said ball, and additional means for adjustably clamping said socket to said ball by exerting a clamping pressure at right angles to that exerted by said handle operated clamping means.

5. In a tripod head, the combination of a normally stationary ball, a socket surrounding said ball and normally universally movable relative thereto, a compressible packing between said socket and ball, and means on said socket to vary the friction between said packing and said ball only when said socket is moved in particular different planes relative thereto.

6. In a tripod head, the combination of a normally stationary ball, a socket surrounding said ball, a compressible packing between said socket and ball, a depression in the surface of said ball to change the amount of friction between said packing and said ball when said socket is moved in particular different planes.

7. In a tripod head, the combination of a normally stationary ball, a socket surrounding said ball, a compressible packing between said socket and ball, and means comprising a plurality of horizontal parallel grooves in said ball to increase the friction between said packing and said ball when said socket is rotated in a plane transverse or oblique to the planes of said grooves as compared with the friction offered when said socket is rotated about an axis perpendicular to the planes of said grooves.

8. In supporting means, the combination of a relatively stationary element, an instrument supporting member rotatable about the horizontal axis of said element, a projection on said element, an arcuate recess formed in said member, a pair of compression springs, positioned in said arcuate recess, each having one end abutting against said member and its other end abutting against said projection, whereby compensation is made for the weight of the camera when the member is tilted in a vertical plane, and a quick detachable liner in said recess forming a bearing surface for said springs, said liner being held in said recess by its resiliency.

9. In a tripod, the combination of a relatively stationary element, a camera supporting member rotatable about the horizontal axis of said element, a projection on said element, an arcuate recess formed in said member, a hard retainer in said recess, and a pair of compression springs positioned within said arcuate recess and guided by said retainer, each of said springs having one end abutting against said supporting member.

10. In a tripod, the combination of a normally stationary element, a camera supporting member universally secured thereto, a guide bar detachably secured to said socket member, said guide bar being hinged at a point intermediate its extremities, and means for clamping said member to said element, said means being operable through the hinge of said guide bar.

11. In supporting means, the combination of a normally stationary element, a camera supporting member universally secured thereto, a bendable guide bar detachably secured to said socket member, said guide bar having a high tension hinge intermediate its ends, and means for clamping said member to said element, said means being operable through the bent portion of said guide bar.

12. In a tripod, the combination of a normally stationary element, a camera supporting member universally secured thereto, a hinged guide bar detachably secured to said socket member, and said hinged guide bar being adapted to be bent, and friction clamping means for holding said bar in bent position.

13. In supporting means, the combination of a normally stationary element, a supporting member universally secured thereto, a tubular guide bar connected to said supporting member, an extension portion hinged so as to be capable of being bent at an angle greater than 30° relative to the axis of said bar, and movable elements contained in said extension portion to transmit force from said extension portion to the guide bar.

14. In supporting means, a relatively stationary element, a member rotatably mounted thereon, and a guide bar secured to said member, said guide bar comprising a rigid portion and a resilient portion, movable through an appreciable angle relative to said rigid portion, said resilient portion comprising a tightly coiled spring.

15. In a panoramic tripod head, a relatively stationary element, a member rotatably mounted thereon, and a guide bar secured to said member, said guide bar comprising a main handle adapted to be rigidly connected to said member, resilient means secured at the end of said handle and forming an extension thereof, and an auxiliary handle secured at the other end of said resilient means, and resilient means forming the sole connection between said main handle and said auxiliary handle.

16. In a panoramic tripod head, a relatively stationary element, a member rotatably mounted thereon, and a guide bar secured to said member, said guide bar comprising a main handle adapted to be rigidly connected to said member, a closely wound coil spring secured at the end of said handle and forming an extension thereof, and an auxiliary handle secured at the other end of said spring.

17. In a panoramic tripod head, the combination of a relatively stationary ball, a socket surrounding said ball, a compressible packing between said ball and socket, resilient means tending to restrain movement of said socket, a guiding handle rigidly secured to said socket, and a resilient flexible extension on said handle.

18. In a camera supporting means, the combination of a relatively stationary element, a camera carrying member universally connected thereto, friction means between said element and member, said means offering different amounts of frictional resistance when said member is moved in different plants relative to said member, and means to compensate for said differences in frictional resistance by increasing the frictional resistance when said member is moved in certain directions.

19. In a camera supporting means, a universal joint composed of a stationary member and a movable member, compressible means interposed between said members to cause harmonious movement when said members are relatively moved, pressure applying means to force once of said members against the other member, and other means cooperating with one of said members and movable therewith without play when said member is moved with respect to the other member, said means being laterally movable relative to the member with which it cooperates to force said members in tight frictional clamping engagement with one another.

20. In a tripod, the combination of a ball having a hard smooth external surface, a pair of socket halves surrounding said ball, means permanently to secure said socket halves together, a pair of packing rings between said socket halves and said ball, one of said rings being located on each side of said ball, means to vary the pressure of the packing upon said ball, and additional means rigidly to clamp said socket said ball, said pressure varying means and said additional means being operable to apply pressure in different directions.

21. In supporting means, a relatively stationary element, a member universally mounted thereon, and a guide bar secured to said member, said bar having a coiled spring portion sufficiently yieldable to permit swinging of its free end through an appreciable angle relative to said member.

In witness whereof, I hereunto subscribe my name this 19th day of October, 1928.

OSCAR U. ZERK.

CERTIFICATE OF CORRECTION.

Patent No. 1,894,457.                                January 17, 1933.

OSCAR U. ZERK

It is hereby certified that error appears in the printed specification of the above numbered patent requiring correction as follows: Page 6, line 25, after "A" insert the word "new"; page 9, line 58, claim 11, for "tension" read "friction", and line 96, claim 15, for "and" read "said"; page 10, line 23, claim 20, after "socket" insert the word "to"; and that the said Letters Patent should be read with these corrections therein that the same may conform to the record of the case in the Patent Office.

Signed and sealed this 14th day of March, A. D. 1933.

M. J. Moore, (Seal)                                              Acting Commissioner of Patents.

ber and a movable member, compressible means interposed between said members to cause harmonious movement when said members are relatively moved, pressure applying means to force once of said members against the other member, and other means cooperating with one of said members and movable therewith without play when said member is moved with respect to the other member, said means being laterally movable relative to the member with which it cooperates to force said members in tight frictional clamping engagement with one another.

20. In a tripod, the combination of a ball having a hard smooth external surface, a pair of socket halves surrounding said ball, means permanently to secure said socket halves together, a pair of packing rings between said socket halves and said ball, one of said rings being located on each side of said ball, means to vary the pressure of the packing upon said ball, and additional means rigidly to clamp said socket said ball, said pressure varying means and said additional means being operable to apply pressure in different directions.

21. In supporting means, a relatively stationary element, a member universally mounted thereon, and a guide bar secured to said member, said bar having a coiled spring portion sufficiently yieldable to permit swinging of its free end through an appreciable angle relative to said member.

In witness whereof, I hereunto subscribe my name this 19th day of October, 1928.

OSCAR U. ZERK.

CERTIFICATE OF CORRECTION.

Patent No. 1,894,457.         January 17, 1933.

OSCAR U. ZERK

It is hereby certified that error appears in the printed specification of the above numbered patent requiring correction as follows: Page 6, line 25, after "A" insert the word "new"; page 9, line 58, claim 11, for "tension" read "friction", and line 96, claim 15, for "and" read "said"; page 10, line 23, claim 20, after "socket" insert the word "to"; and that the said Letters Patent should be read with these corrections therein that the same may conform to the record of the case in the Patent Office.

Signed and sealed this 14th day of March, A. D. 1933.

M. J. Moore, (Seal)         Acting Commissioner of Patents.

CERTIFICATE OF CORRECTION.

Patent No. 1,894,457.                                                              January 17, 1933.

OSCAR U. ZERK

It is hereby certified that error appears in the printed specification of the above numbered patent requiring correction as follows: Page 6, line 25, after "A" insert the word "new"; page 9, line 58, claim 11, for "tension" read "friction", and line 96, claim 15, for "and" read "said"; page 10, line 23, claim 20, after "socket" insert the word "to"; and that the said Letters Patent should be read with these corrections therein that the same may conform to the record of the case in the Patent Office.

Signed and sealed this 14th day of March, A. D. 1933.

M. J. Moore, (Seal)                                                          Acting Commissioner of Patents.